(12) United States Patent
Sharrow et al.

(10) Patent No.: US 7,108,940 B2
(45) Date of Patent: Sep. 19, 2006

(54) BATTERY MECHANISM

(75) Inventors: Joseph F. Sharrow, Fredericksburg, VA (US); Kurt W. Solomon, Fredericksburg, VA (US); Frank E. Peterkin, Fredericksburg, VA (US); Jack S. Bernardes, King George, VA (US); Brian J. Hankla, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 542 days.

(21) Appl. No.: 10/457,698

(22) Filed: May 16, 2003

(65) Prior Publication Data
US 2004/0229112 A1   Nov. 18, 2004

(51) Int. Cl.
*H01M 2/10* (2006.01)
*H01M 6/00* (2006.01)
*H01M 6/42* (2006.01)
*H01M 6/46* (2006.01)
*H01M 10/00* (2006.01)

(52) U.S. Cl. .................... 429/97; 429/96; 429/99; 429/149; 429/150; 429/152; 429/153; 429/159

(58) Field of Classification Search .............. None
See application file for complete search history.

(56) References Cited

U.S. PATENT DOCUMENTS

| | | | |
|---|---|---|---|
| 4,957,829 A | 9/1990 | Holl | 429/99 |
| 5,140,744 A | 8/1992 | Miller | 29/730 |
| 5,486,432 A * | 1/1996 | Sharrah et al. | 429/99 |
| 5,496,657 A | 3/1996 | Dixon, Jr. | 429/62 |
| 5,709,964 A | 1/1998 | Christensen et al. | 429/153 |
| 6,027,828 A | 2/2000 | Hahn | 429/100 |
| 6,265,091 B1 | 7/2001 | Pierson et al. | 429/1 |

\* cited by examiner

*Primary Examiner*—Patrick Joseph Ryan
*Assistant Examiner*—Karie O'Neill
(74) *Attorney, Agent, or Firm*—Gerhard W. Thielman, Esq; Oscar A. Towler, III, Esq; Marguerite O. Dineer, Esq (57) ABSTRACT

A battery mechanism is disclosed. The battery mechanism in one embodiment includes battery assemblies, a switching mechanism, and an actuating mechanism. The battery assemblies are removably mounted to the switching mechanism. The switching mechanism has a non-energized position in which the battery assemblies are electrically disconnected from the switching mechanism. The switching mechanism also has an energized position in which the battery assemblies are electrically connected to the switching mechanism. The actuating mechanism is connected to the switching mechanism, and switches the switching mechanism between the non-energized and the energized positions. The actuating mechanism preferably is activated remotely, improving personnel safety. The number and make-up of the battery assemblies may be varied to provide for different voltages.

19 Claims, 11 Drawing Sheets

BATTERY MECHANISM

FIELD OF THE INVENTION

This invention relates generally to battery mechanisms, and more particularly to such mechanisms that preferably can safely, reliably, and remotely combine multiple battery assemblies.

BACKGROUND OF THE INVENTION

High-powered electrical devices at least occasionally require portable operation. This means that the devices must be able to be used off battery power. Such high-powered electrical devices include those used in pulsed power systems, which may find applicability in both military and non-military scenarios. The high voltage needed to power the electrical devices means that battery packs which power such electrical devices must themselves be able to provide high voltage. Such high-voltage battery packs are inherently dangerous, however. Incorrect installation or assembly of the battery packs, or defective battery packs, can potentially severely injure or even kill personnel. For these and other reasons, therefore, there is a need for the present invention.

SUMMARY OF THE INVENTION

The invention relates to a battery mechanism. In one embodiment of the invention, the battery mechanism includes battery assemblies, a switching mechanism, and an actuating mechanism. The battery assemblies are removably mounted to the switching mechanism. The switching mechanism has a non-energized position in which the battery assemblies are electrically disconnected from the switching mechanism. The switching mechanism also has an energized position in which the battery assemblies are electrically connected to the switching mechanism. The actuating mechanism is connected to the switching mechanism, and switches the switching mechanism between the non-energized and the energized positions.

In another embodiment of the invention, the battery mechanism includes a protruding switching mechanism, battery assemblies, and an actuating means. The battery assemblies each have electrically separate battery packs that are electrically connected to one another upon the battery assemblies slidably mounting onto the protruding switching mechanism. The actuating means is for switching the protruding switching mechanism between a non-energized position and an energized position. In the non-energized position, the battery assemblies are electrically disconnected from the protruding switching mechanism, whereas in the energized position, the battery assemblies are electrically connected to the protruding switching mechanism.

In another embodiment of the invention, a method includes sliding battery packs over rods of a mounting plate and over a rod-shaped switching mechanism that is fixably mounted to the mounting plate. The battery assemblies each have holes corresponding to and aligning with the rods and the rod-shaped switching mechanism. A mounting bracket is fastened over the battery assemblies to the mounting plate. The rod-shaped switching mechanism is initially in a non-energized position in which it is electrically disconnected from the battery assemblies. An actuating mechanism that is fixably mounted to the mounting plate and/or the rod-shaped switching mechanism is actuated to cause the switching mechanism to rotate to an energized position, in which the switching mechanism is electrically connected to the battery assemblies.

Embodiments of the invention provide for advantages over the prior art. Improved safety is provided for, because the final voltage of the battery mechanism is not reached until the actuating mechanism switches the switching mechanism to an energized position. Preferably, the actuating mechanism can be remotely activated, decreasing potential harm to personnel. Furthermore, the battery mechanism is scalable in the voltage it provides. For instance, the number of battery packs within the battery assemblies, as well as the number of battery assemblies, can be varied to achieve a desired final voltage. Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
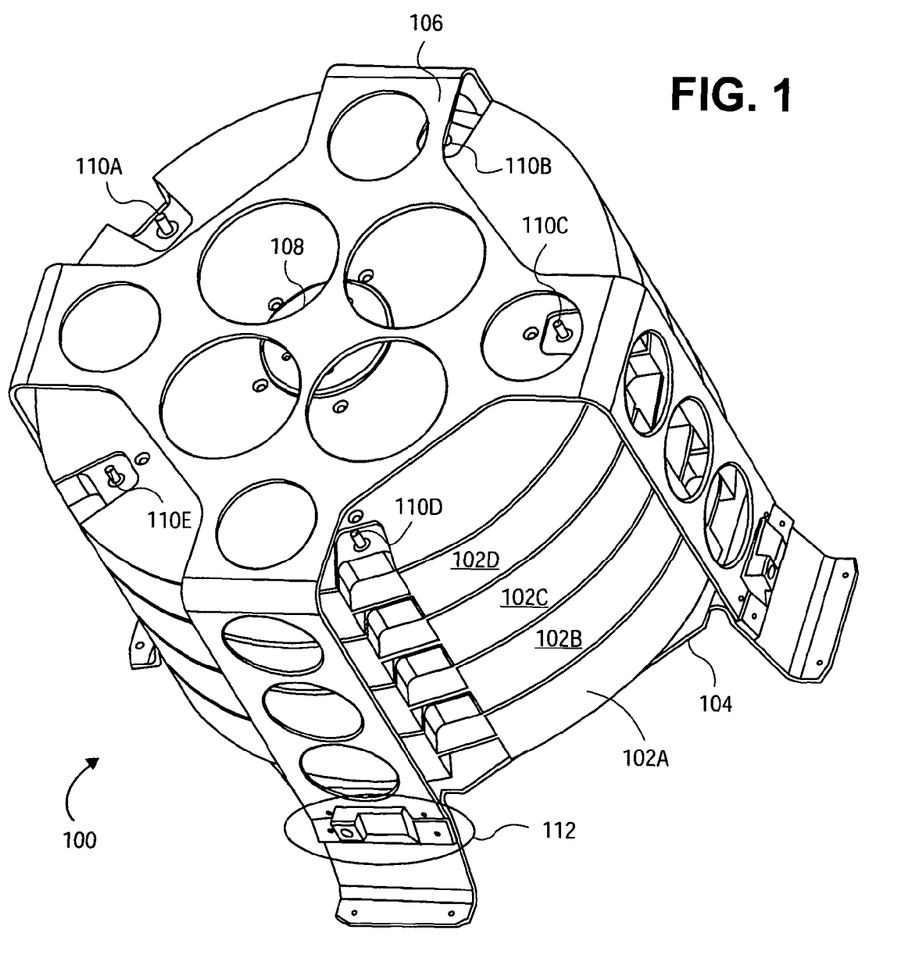
FIG. 1 is a diagram of a perspective view of a battery mechanism, according to an embodiment of the invention.

FIG. 1 shows a perspective view of a battery mechanism 100, according to an embodiment of the invention. A number of battery assemblies 102A, 102B, 102C, and 102D, collectively referred to as the battery assemblies 102 are removably mounted on rods 110A, 110B, 110C, 110D, and 110E, collectively referred to as the rods 110, protruding from a bottom mounting plate 104. The battery assemblies 102 thus have holes that correspond to and align with the rods 110 of the mounting plate 104. A top mounting bracket 106 is fastened over the battery assemblies 102, and lockably mounts to the mounting plate 104. For instance, the indicated area 112 shows one place in which the mounting bracket 106 fastens to the mounting plate 104. The fastening may be accomplished by screw, latches, an interlocking mechanism, or other types of fastening, as can be appreciated by those of ordinary skill within the art. A rod-shaped switching mechanism 108 runs concentrically through holes of the battery assemblies 102 as well, the holes defined by interior surfaces of the battery assemblies 102. The switching mechanism 108 is preferably fixably mounted to the mounting plate 104.

Figure 2:
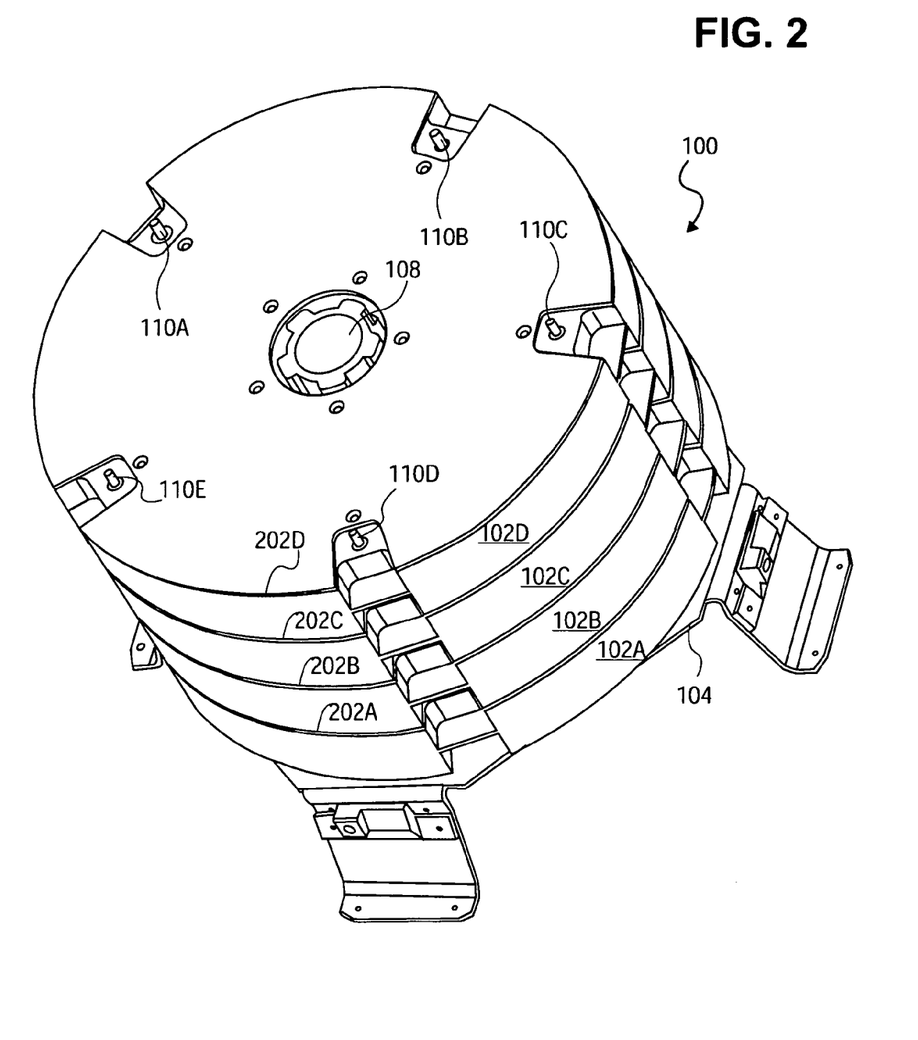
FIG. 2 is a diagram of a perspective view of a battery mechanism, according to an embodiment of the invention, in which a top mounting bracket has been removed

FIG. 2 shows a perspective view of the battery mechanism 100, according to an embodiment of the invention, in which the top mounting bracket 106 is not present. The battery assemblies 102A, 102B, 102C, and 102D are depicted as having covers 202A, 202B, 202C, and 202D, respectively, which are collectively referred to as the covers 202. The covers 202 may be acrylic plastic covers. The battery assemblies 102 are depicted as being cylindrical in shape, or platter-shaped. The switching mechanism 108 again runs concentrically through holes of the battery assemblies 102, and may be a switching cam in one embodiment. The rods 110 of the mounting plate 104 again run through holes of the battery assemblies 102.

Figure 3:
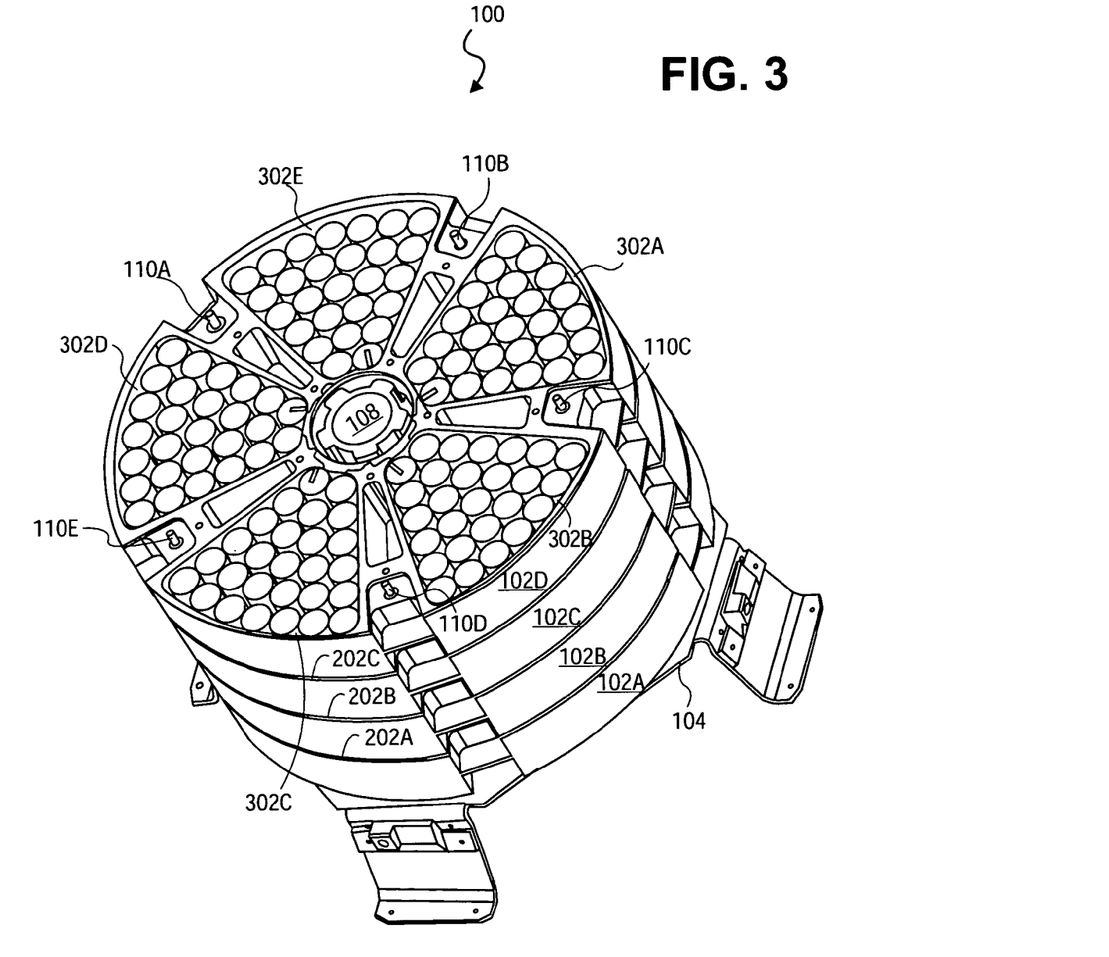
FIG. 3 is a diagram of a perspective view of a battery mechanism, according to an embodiment of the invention, in which a cover for a battery assembly has been removed

FIG. 3 shows a perspective view of the battery mechanism 100, according to an embodiment of the invention, in which the cover 202D for the battery assembly 102D has been removed for illustrative clarity. As such, the battery assembly 102D is depicted as having five battery packs 302A, 302B, 302C, 302D, and 302E, collectively referred to as the battery packs 302. The battery assemblies 102A, 102B, and 102C similarly have five battery packs, which are not shown in FIG. 3. The battery packs 302 of the battery assembly 102D are not electrically connected to one another when the battery assembly 102D is removed from the switching mechanism 108. That is, the battery packs 302 are electrically separate. The battery packs 302 can in one embodiment be rechargeable 35-volt pie slice-shaped nickel-cadmium battery packs, such that each of the battery assemblies 102 provides 175 volts, for a total of 700 volts for the entire battery mechanism 100.

The number of the battery assemblies 102 can vary so that the battery mechanism 100 provides a desired voltage. For instance, where each of the battery assemblies 102 provides 175 volts, using two of the assemblies 102 within the battery mechanism 100 yields 350 volts, and utilizing three yields 525 volts. Similarly, the number of the battery packs 302 in each of the battery assemblies 102 can vary so that the battery mechanism 100 provides a desired voltage. For instance, where there are two of the assemblies 102, if each has four of the battery packs 302, and each of the battery packs 302 provides 35 volts, then the battery mechanism 100 yields 2 times 4 times 35, or 280 volts. As another example, if there are two of the assemblies 102, and each has three of the battery packs 302, then the battery mechanism 100 yields 2 times 3 times 35, or 210 volts, where each of the battery packs 302 provides 35 voltages. Finally, the voltage provided by each of the battery packs 302 can also vary so that the battery mechanism 100 provides a desired voltage. If there are two of the assemblies 102, and each has four of the battery packs 302, then if each of the battery packs 302 provides 50 volts, the battery mechanism 100 yields 2×4× 50, or 400 volts. However, if each of the battery packs 302 only provides 20 volts, then the battery mechanism 100 would provide 2×4×20, or 160 volts.

Figure 4:
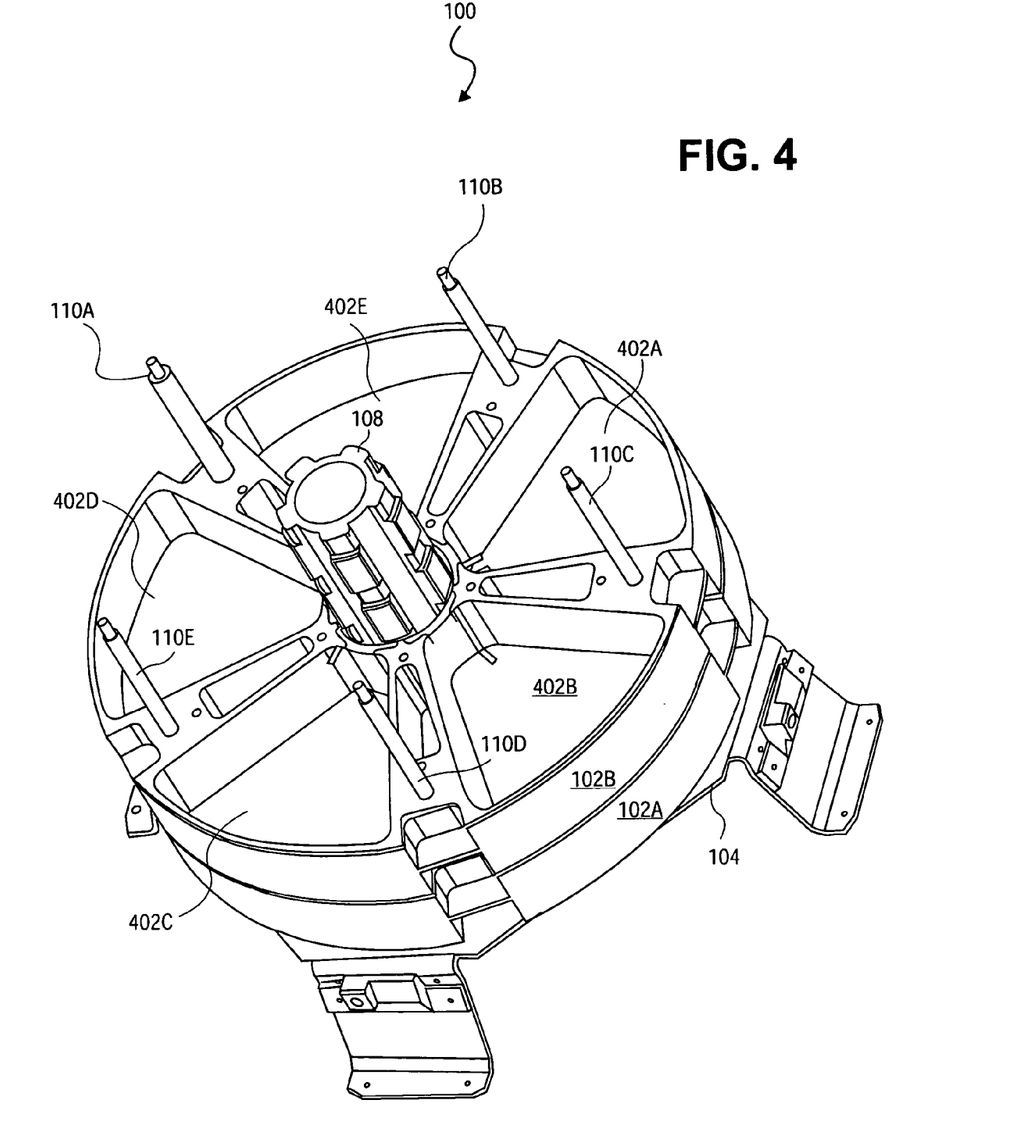
FIG. 4 is a diagram of a perspective view of a battery mechanism, according to an embodiment of the invention, in which only two battery assemblies are shown.

FIG. 4 shows a perspective view of the battery mechanism 100, according to an embodiment of the invention, in which only the battery assemblies 102A and 102B are present, and the cover 202B has been removed from the battery assembly 102B, for illustrative clarity. The battery assembly 102B has five battery packs 402A, 402B, 402C, and 402E, collectively referred to as the battery packs 402. However, unlike the battery packs 302 of FIG. 3, the battery packs 402 of FIG. 4 are empty of their constituent battery cells for illustrative clarity. FIG. 4 clearly depicts the rods 110 protruding from the mounting plate 104 on which battery assemblies 102 are slidably mounted. The rods 110 are preferably of stainless steel. The rod 110A is larger than the rods 110B, 110C, 110D, and 110E in diameter so that the battery assemblies 102 may only be installed in one rotational orientation, providing a positive keying arrangement. That is, improper removable mounting of the assemblies 102 is prevented. More generally, the rod 110A is differently sized than the other of the rods 110.

Figure 5:
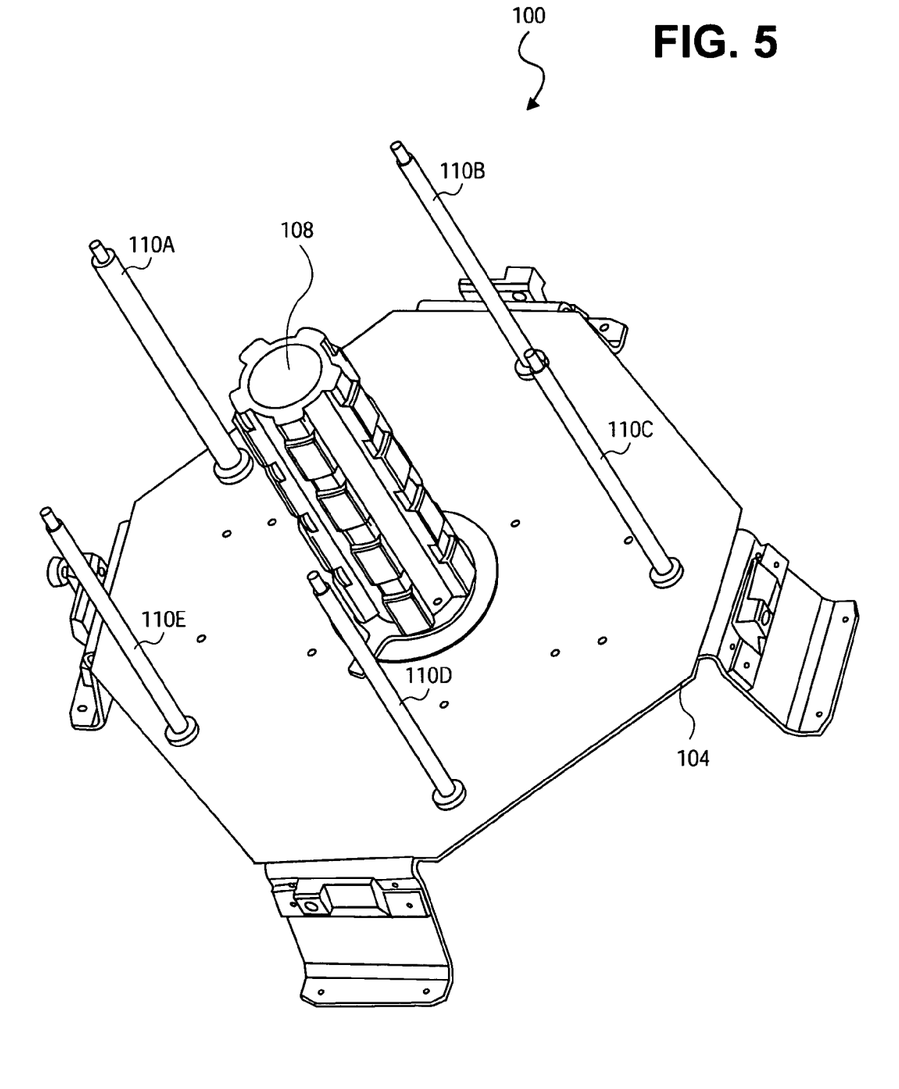
FIG. 5 is a diagram of a perspective view of a battery mechanism, according to an embodiment of the invention, in which all battery assemblies have been removed.

FIG. 5 shows a perspective view of the battery mechanism 100, according to an embodiment of the invention, in which all the battery assemblies 102 have been removed for illustrative clarity. FIG. 5 thus clearly depicts the mounting plate 104, from which the rods 110, including the over-sized rod 110A, protrude. The rod-shaped switching mechanism 108 is also depicted as protruding from the mounting plate 104.

Figure 6:
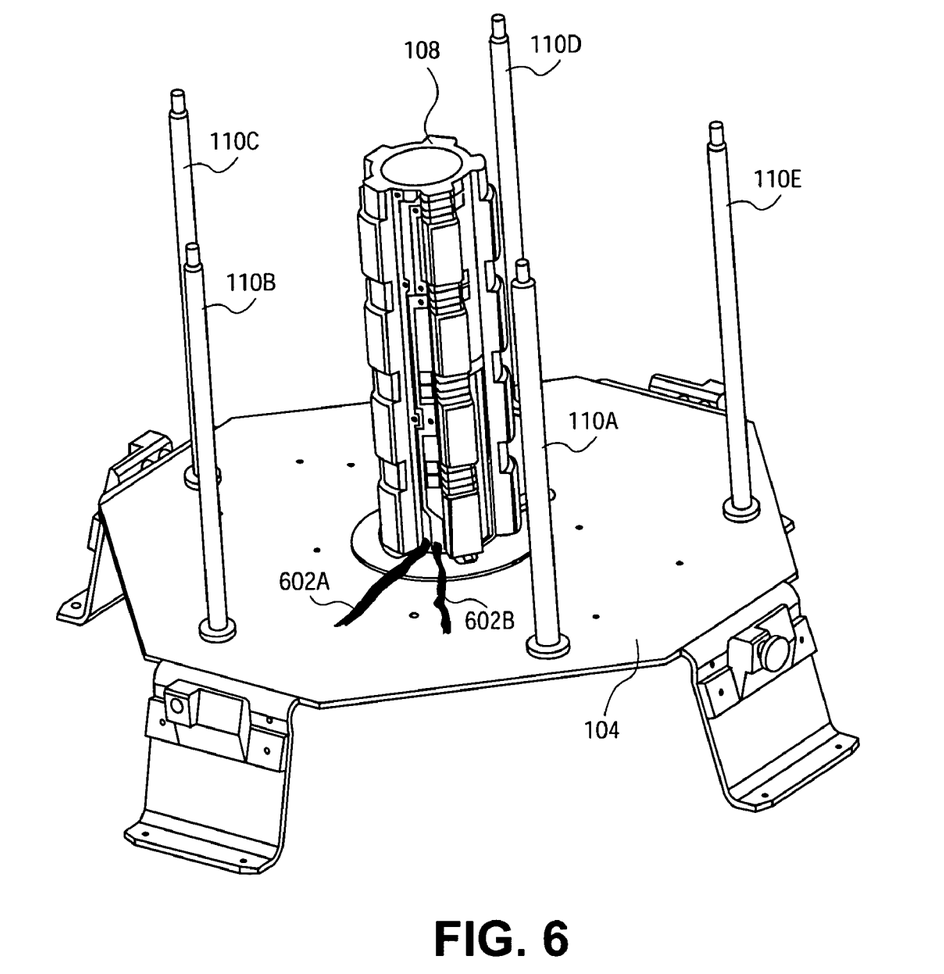
FIG. 6 is a diagram of a perspective view of a battery mechanism, according to an embodiment of the invention, in which leads for the battery mechanism are shown.

FIG. 6 shows a perspective view of the battery mechanism 100, according to an embodiment of the invention, in which all the battery assemblies 102 have also been removed for illustrative clarity. Positive and negative leads 602A and 602B, collectively referred to as the leads 602, are depicted as being electrically connected to and emanating from the switching mechanism 108. The leads 602 are the output leads to which electrical equipment is connected to receive power from the battery mechanism 100. The rods 110 are again depicted as protruding from the mounting plate 104, as is the switching mechanism 108.

Figure 7:
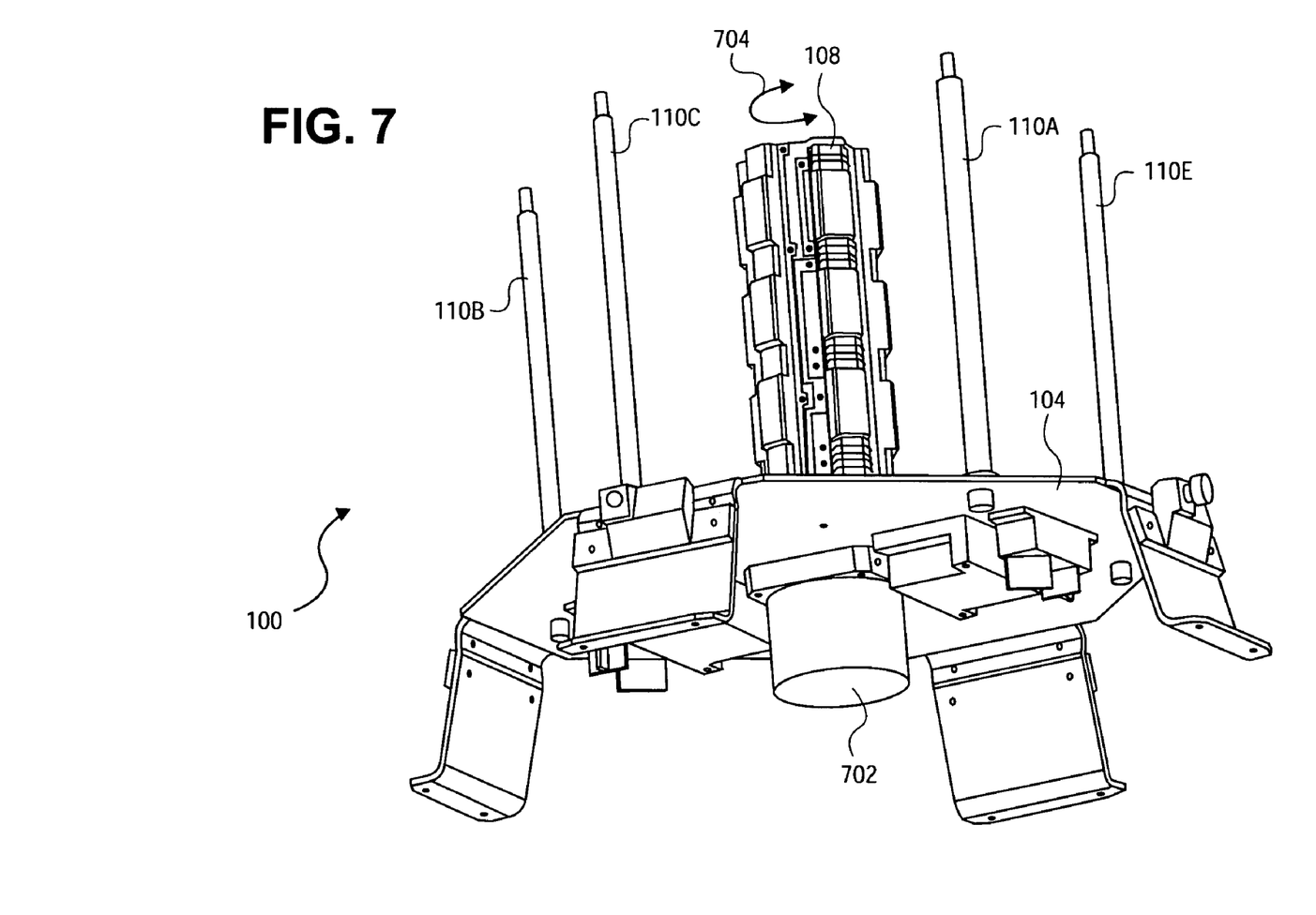
FIG. 7 is a diagram of a perspective view of the underside of a battery mechanism, according to an embodiment of the invention.

FIG. 7 shows a perspective view of and including the underside of the battery mechanism 100, according to an embodiment of the invention, in which all the battery assemblies 102 have been removed for illustrative clarity. An actuating mechanism 702 is fixably situated, or mounted, on the underside of the mounting plate 104, and is coupled to the switching mechanism 108. The actuating mechanism 702 may be a pneumatic actuator that operates at about 100 pounds-per-square inch. The actuating mechanism 702 rotates the switching mechanism 108, as indicated by the bi-directional arrow 704.

The actuating mechanism 702 rotates within the holes of the battery assemblies 102 (not shown in FIG. 7), and the battery assemblies 102 themselves do not rotate. This switches the switching mechanism from a non-energized position to an energized position, as is described in more detail later in the detailed description, such that the battery mechanism 100 provides power. When the actuating mechanism 702 is deactivated, the switching mechanism 108 rotates back from the energized position to the non-energized position, as also indicated by the bi-directional arrow 704, and the battery mechanism 100 no longer provides power. The actuating mechanism 702 may be remotely actuated. For instance, a remote control system may be in place such that personnel are able to press a button, which causes the actuating mechanism 702 to actuate, as can be appreciated by those of ordinary skill within the art. Other types of remote actuation are also encompassed by embodiments of the invention.

Figure 8:
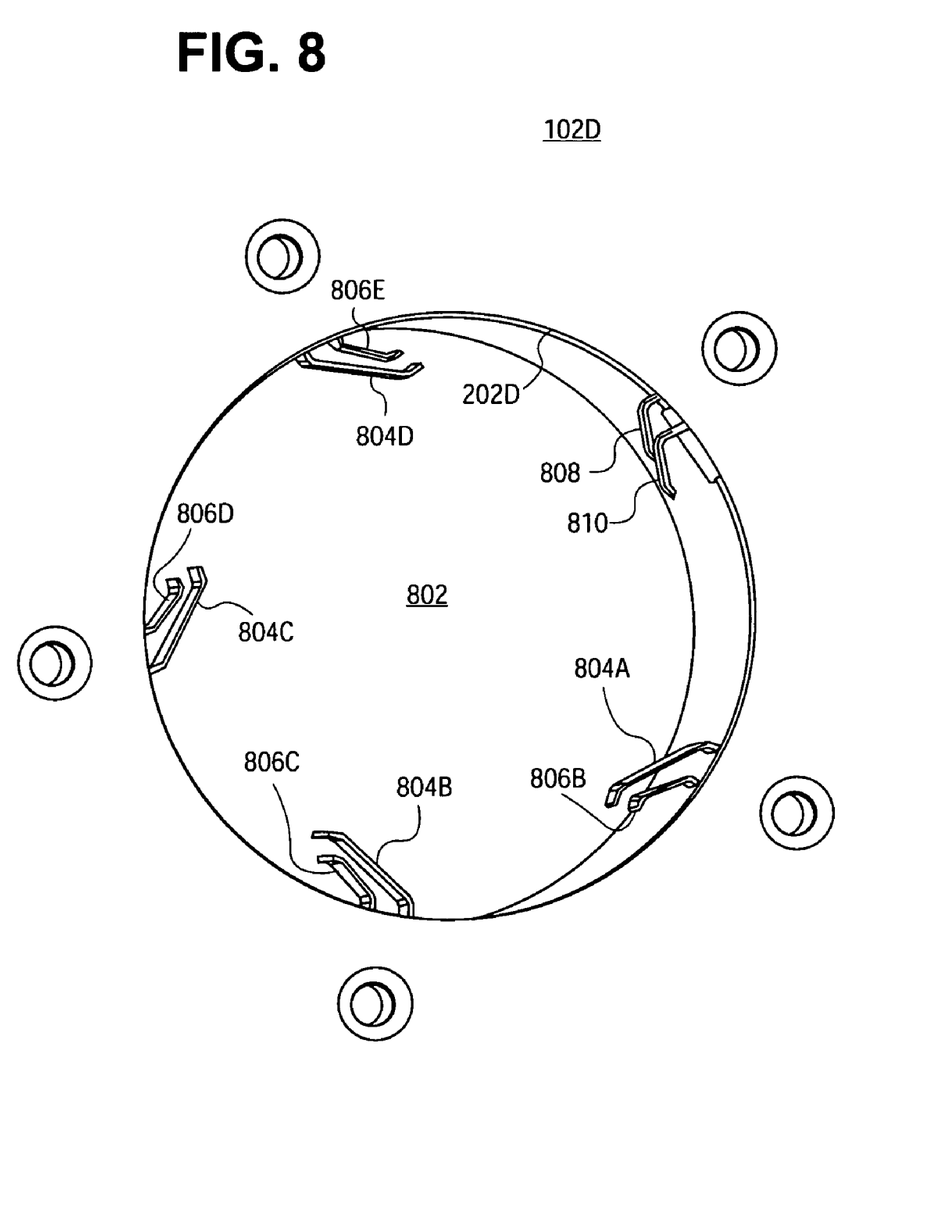
FIGS. 8 and 9 are diagrams of partial enlarged perspective views of a battery assembly for a battery mechanism, according to an embodiment of the invention.
Figure 9:
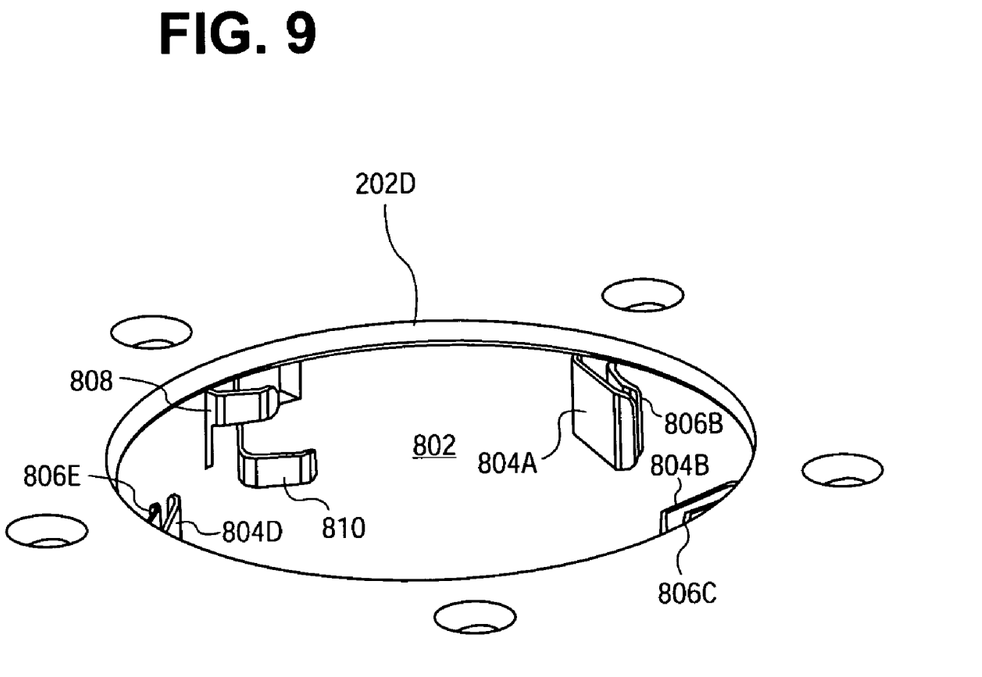

FIGS. 8 and 9 show partial enlarged perspective views of the battery assembly 102D, according to an embodiment of the invention. The different views depicted in FIGS. 8 and 9 are provided for illustrative clarity. The battery assembly 102D is particularly described as representative of all the battery assemblies 102. The battery assembly 102D includes positive contacts 804A, 804B, 804C, and 804D, collectively referred to as the positive contacts 804, for and corresponding to the battery packs 302A, 302B, 302C, and 302D of FIG. 3 of the battery assembly 102. The battery assembly 102D also includes negative contacts 806B, 806C, 806D, and 806E, collectively referred to as the negative contacts 806, for and corresponding to the battery packs 302B, 302C, 302D, and 302E of FIG. 3 of the battery assembly 102. The contacts 804 and 806 maybe beryllium copper switch contacts, and are electrically connected internally to their corresponding battery packs 302. When the battery assembly 102D is not slidably mounted on the switching mechanism 108 (not shown in FIG. 7), the contacts 804 and 806 do not make contact with one another, such that the battery packs 302 are electrically disconnected from one another.

However, when the switching mechanism 108 is slid through the hole 802 of the battery assembly 102D, the battery packs 302 are electrically connected to one another as follows. The positive contact 804A of the battery pack 302A makes physical contact with the negative contact 806B of the battery pack 302B since the former is situated near the latter, electrically connecting the packs 302A and 302B. This is because the switching mechanism 108 forces the contacts 804A and 806B against one another. The positive contact 804B of the battery pack 302B makes physical contact with the negative contact 806C of the battery pack 302C since the former is situated near the latter, electrically connecting the packs 302B and 302C. This is also because the switching mechanism 108 forces the contacts 804B and 806C against one another.

The positive contact 804C of the battery pack 302C makes physical contact with the negative contact 806D of the battery pack 302D since the former is situated near the latter, electrically connecting the packs 302C and 302D. As before, this is because the switching mechanism 108 forces the contacts 804C and 806D against one another. Finally, the positive contact 804D of the battery pack 302D makes physical contact with the negative contact 806E of the battery pack 302E since the former is situated near the latter, electrically connecting the packs 302D and 302E. This is again because the switching mechanism 108 forces the contacts 804D and 806E against one another. More generally, adjacent pairs of the positive contacts 804 and the negative contacts 806 are thus forced to make contact with one another by the switching mechanism 108 being inserted into the hole 802.

The contacts 808 and 810 function differently than the contacts 804 and 806 do. The contact 808 is a positive contact of the battery pack 302E, whereas the contact 810 is a negative contact of the battery pack 302A. The positive contact 808 electrically connects to a corresponding positive contact of the switching mechanism 108, and the negative contact 810 electrically connects to a corresponding negative contact of the switching mechanism 108, when the battery assembly 102D is slidably mounted on the switching mechanism 108, and the switching mechanism 108 has rotated to an energized position. This is described in more detail later in the detailed description.

Because the battery packs 302 are already electrically connected to one another via the contacts 804 and 806, electrically connecting the contacts 808 and 810 to the switching mechanism 108 effectively electrically connects all the battery packs 302 to the switching mechanism 108. It is also noted that the contacts 804, 806, 808, and 810 are positively retained in their respective positions by the cover 202D for the battery assembly 102D. The contacts 804 and 806 may be referred to as secondary contacts, whereas the contacts 808 and 810 may be referred to as primary contacts. Both the primary contacts and the secondary contacts are mounted to the interior surface of the battery assembly 102D.

Figure 10:
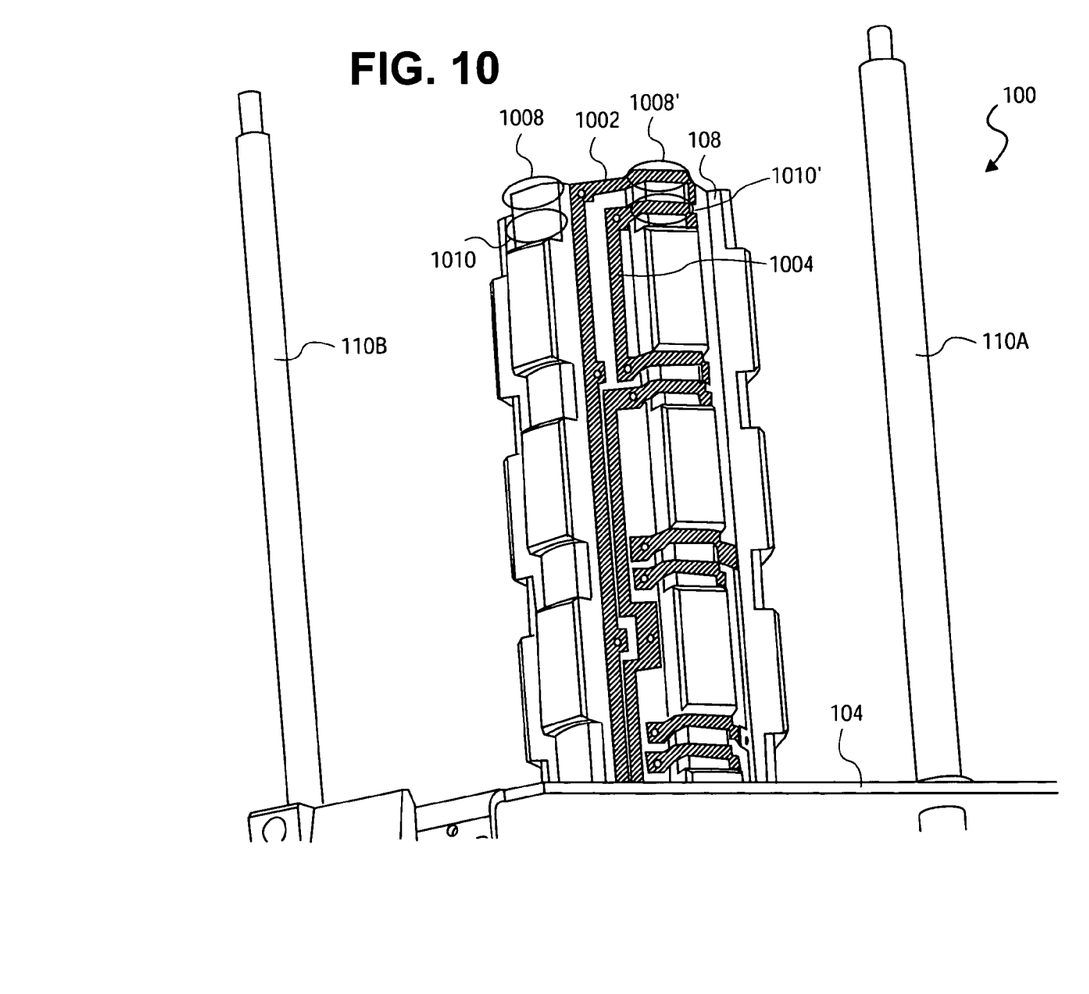
FIG. 10 is a diagram of a partial enlarged perspective view of a battery mechanism, according to an embodiment of the invention.

FIG. 10 shows a partial enlarged perspective view of the battery mechanism 100, according to an embodiment of the invention, in which the switching mechanism 108 is shown in detail for illustrative clarity. The switching mechanism 108 protrudes from the mounting plate 104, as do the visible rods 110A and 10B. The switching mechanism 108 includes a positive terminal 1002 and a negative terminal 1004, which may also be referred to as a primary positive contact and a primary negative contact, respectively. When the switching mechanism 108 has rotated to its energized position, the positive contact 808 of FIGS. 8 and 9 makes physical contact with the positive terminal 1002, and the negative contact 810 of FIGS. 8 and 9 makes physical contact with the negative terminal 1004. This electrically connects the battery assemblies 102 to the switching mechanism 108, providing power at the leads 602 of FIG. 6. However, when the switching mechanism 108 has rotated back to its non-energized position, the contacts 808 and 810 no longer make physical contact with the terminals 1002 and 1004. The battery assemblies 102 are thus electrically disconnected from the switching mechanism 108, and no power is provided at the leads 602 of FIG. 6.

For instance, in the non-energized position, the switching mechanism 108 has areas 1008 and 1010 which with the electrical contacts 808 and 810 of FIGS. 8 and 9 make contact, respectively. Because the areas 1008 and 1010 are not on the terminals 1002 and 1004, respectively, the contacts 808 and 810 do not make electrical contact with the terminals 1002 and 1004. That is, electricity does not flow from the contacts 808 and 810 to the terminals 1002 and 1004 in the non-energized position. By comparison, in the energized position, the switching mechanism 108 rotates such that the areas 1008' and 1010' on the terminals 1002 and 1004, respectively, make contact with the contacts 808 and 810 of FIGS. 8 and 9, respectively. That is, the contacts 808 and 810 make electrical contact with the terminals 1002 and 1004 at the areas 1008' and 1010', such that electricity flows from the contacts 808 and 810 to the terminals 1002 and 1004.

Figure 11:
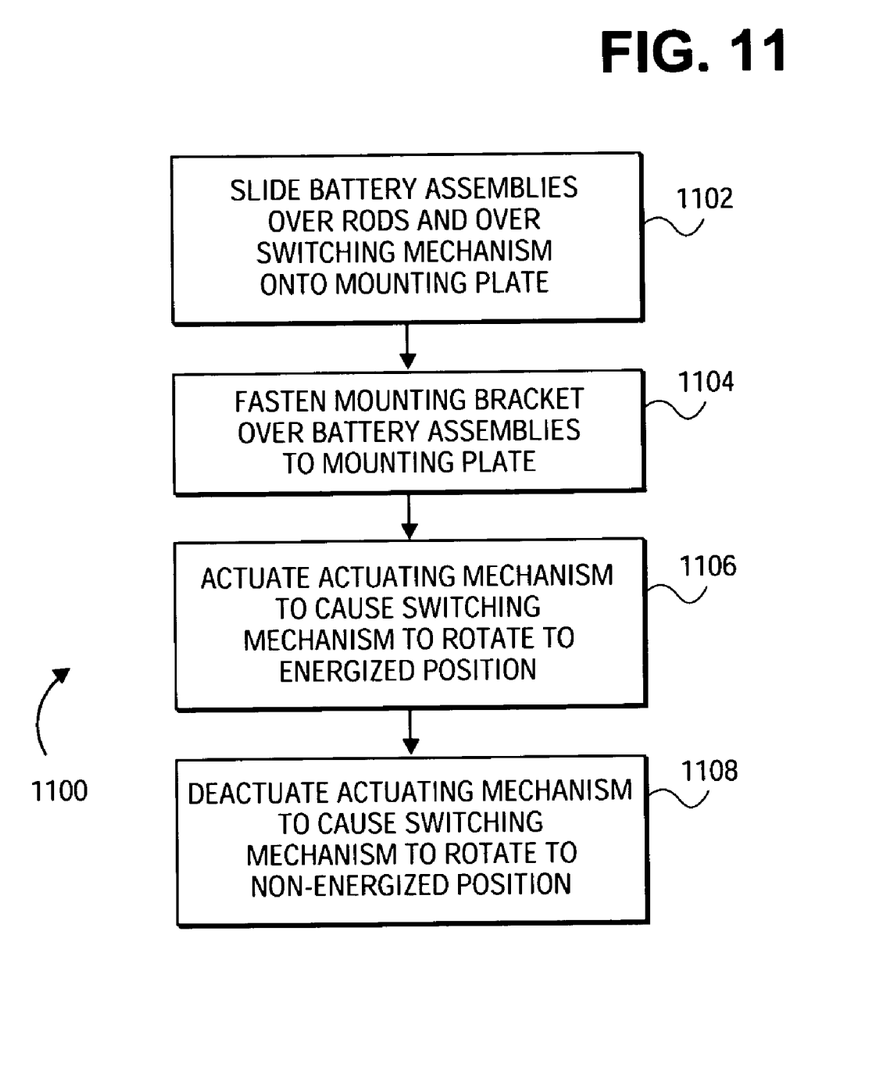
FIG. 11 is a flowchart of a method for using a battery mechanism, according to an embodiment of the invention.

FIG. 11 shows a method 1100 for utilizing the battery mechanism 100, according to an embodiment of the invention. The battery assemblies 102 are slid over the rods 110 and over the switching mechanism 108 onto the mounting plate 104 (1102). That is, the holes of the battery assemblies 102 are aligned over the rods 110 and the switching mechanism 108 so that the battery assemblies 102 can slide over and onto the rods 110 and the switching mechanism 108. Prior to such mounting, the battery packs of the battery assemblies 102 may be individually charged while installed in the battery assemblies 102. The mounting bracket 106 is then fastened over the battery assemblies 102 to the mounting plate 104 (1104). In addition, nuts, such as wing nuts, may be screwed onto the ends of the rods 110 to further secure the battery assemblies 102.

The battery mechanism 100 is initially in a non-energized state, because the switching mechanism 108 is initially in its non-energized position, such that the switching mechanism 108 is electrically disconnected from the battery assemblies 102. The actuating mechanism 702 is actuated to cause the switching mechanism 108 to rotate to its energized position (1106), causing the battery mechanism 100 to enter an energized state. Rotating the switching mechanism 108 to its energized position causes contacts 808 and 810 to make electrical contact with the terminals 1002 and 1004, respectively, such that power is provided at the leads 602. Activating the actuating mechanism 702 can in one embodiment mean pressurizing the actuator, where the actuating mechanism 702 is a pneumatic actuator.

Similarly, the actuating mechanism 702 is deactuated to cause the switching mechanism 702 to rotate back to its original, non-energized position (1108), causing the battery mechanism 100 to reenter its non-energized state. That is, the contacts 808 and 810 no longer make electrical contact with the terminals 1002 and 1004, respectively, such that power is no longer provided at the leads 602. Deactivating the actuating mechanism 702 can in one embodiment mean applying pressure to the deactivation side of the actuating mechanism 702, where the actuating mechanism 702 is a pneumatic actuator.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A battery mechanism comprising:
    a plurality of battery assemblies;
    a switching mechanism to which the battery assemblies are removably mounted, the switching mechanism having a non-energized position in which the battery assemblies are electrically disconnected from the switching mechanism and an energized position in which the battery assemblies are electrically connected to the switching mechanism; and,
    an actuating mechanism coupled to the switching mechanism to switch the switching mechanism between the non-energized position and the energized position, wherein each battery assembly comprises:
    a plurality of electrically separate battery packs;
    an interior surface of the plurality of electrically separate battery packs defining a hole;
    a pair of primary positive and negative contacts mounted on the interior surface;
    a plurality of secondary positive contacts mounted on the interior surface and corresponding to the plurality of battery packs; and,
    a plurality of secondary negative contacts mounted on the interior surface and corresponding to the plurality of battery backs,
    wherein the secondary positive contact of each battery pack is situated on the interior surface near the secondary negative contact of an adjacent battery pack.

2. The battery mechanism of claim 1, wherein the switching mechanism protrudes through the holes of the battery assemblies, such that removably mounting the battery assemblies onto the switching mechanism causes the secondary positive contact of each battery pack to contact the secondary negative contact of the adjacent battery pack.

3. The battery mechanism of claim 2, wherein the switching mechanism comprises an outer surface and a pair of primary positive and negative contacts mounted on the outer surface, such that in the non-energized position the pair of primary positive and negative contacts of the switching mechanism do not contact the pairs of primary positive and negative contacts of the battery assemblies.

4. The battery mechanism of claim 3, wherein actuation of the actuating mechanism causes the switching mechanism to rotate within the holes of the battery assemblies, such that the pair of primary positive and negative contacts of the switching mechanism make contact with the pairs of primary positive and negative contacts of the battery assemblies, causing the switching mechanism to enter the energized position.

5. The battery mechanism of claim 2, further comprising a mounting plate on which switching mechanism and the actuating mechanism are fixably mounted and having a plurality of protruding rods, each battery assembly having a number of holes corresponding to the plurality of protruding rods such that each battery assembly is slidably mounted onto the protruding rods of the mounting plate.

6. The battery mechanism of claim 5, wherein one of the protruding rods is differently sized than other of the protruding rods to prevent improper removable mounting of the battery assemblies onto the protruding rods of the mounting plate.

7. The battery mechanism of claim 5, further comprising a mounting bracket lockably mounted to the mounting plate over the battery assemblies.

8. The battery mechanism of claim 1, wherein the battery assemblies each have a plurality of electrically separate battery packs that are electrically connected to one another upon the battery assemblies removably mounting onto the switching mechanism.

9. The battery mechanism of claim 1, wherein the battery assemblies each is a cylindrically shaped battery platter.

10. The battery mechanism of claim 1, wherein the switching mechanism is a rod-shaped cam.

11. The battery mechanism of claim 1, wherein the actuating mechanism is a pneumatic actuator.

12. A battery mechanism comprising:
    a protruding switching mechanism;
    a plurality of battery assemblies, each having a plurality of electrically separate battery packs that are electrically connected to one another upon the battery assemblies slidably mounting onto the protruding switching mechanism; and,
    actuating means for switching the protruding switching mechanism between a non-energized position in which the battery assemblies are electrically disconnected from the protruding switching mechanism and an energized position in which the battery assemblies are electrically connected to the protruding switching mechanism.

13. The battery mechanism of claim 12, further comprising a mounting plate on which the switching mechanism and the actuating means are fixably mounted and having a plurality of protruding rods, each battery assembly slidably mounted onto the protruding rods of the mounting plate.

14. The battery mechanism of claim 13, further comprising a mounting bracket lockably mounted to the mounting plate over the battery assemblies.

15. The battery mechanism of claim 13, wherein one of the protruding rods is differently sized than other of the protruding rods to prevent improper slidable mounting of the battery assemblies onto the protruding rods of the mounting plate.

16. The battery mechanism of claim 12, wherein the battery assemblies each is a cylindrically shaped battery platter, and the switching mechanism is a rod-shaped cam.

17. A method comprising:
 sliding a plurality of battery assemblies over a plurality of rods of a mounting plate and over a rod-shaped switching mechanism fixably mounted to the mounting plate, the battery assemblies each having a plurality of holes corresponding to and aligning with the plurality of rods and the rod-shaped switching mechanism; and,
 fastening a mounting bracket over the plurality of battery assemblies to the mounting plate,
 wherein the rod-shaped switching mechanism is in a non-energized position in which the rod-shaped switching mechanism is electrically disconnected from the plurality of battery assemblies.

18. The method of claim 17, further comprising actuating an actuating mechanism fixably mounted to at least one of the mounting plate and the rod-shaped switching mechanism, actuation of the actuating mechanism causing the rod-shaped switching mechanism to rotate to an energized position in which the rod-shaped switching mechanism is electrically connected to the plurality of battery assemblies.

19. The method of claim 18, further comprising deactuating the actuating mechanism such that the rod-shaped switching mechanism rotates back to the non-energized position.

* * * * *